United States Patent [19]

Benjey

[11] Patent Number: 5,054,508
[45] Date of Patent: Oct. 8, 1991

[54] FUEL TANK VENT SYSTEM AND DIAPHRAGM VALVE FOR SUCH SYSTEM

[75] Inventor: Robert P. Benjey, Webster Township, Mich.

[73] Assignee: G.T. Products, Inc., Ann Arbor, Mich.

[21] Appl. No.: 607,744

[22] Filed: Oct. 29, 1990

Related U.S. Application Data

[63] Continuation of Ser. No. 470,318, Jan. 25, 1990, abandoned.

[51] Int. Cl.$^5$ .............................................. F16K 24/00
[52] U.S. Cl. ..................... 137/43; 137/587; 220/85 VR; 220/85 VS; 220/86.2; 251/61.3
[58] Field of Search ............ 137/43, 587; 220/85 VR, 220/85 VS, 86 R, 86.2; 251/61.3

[56] References Cited

U.S. PATENT DOCUMENTS

| 3,177,890 | 4/1965 | Rosenberg | 137/460 |
|---|---|---|---|
| 3,746,036 | 7/1973 | Du Bois et al. | 251/61.3 X |
| 3,957,025 | 5/1976 | Heath et al. | |
| 4,153,073 | 5/1979 | Deters | |
| 4,292,020 | 9/1981 | Hirt | |
| 4,610,284 | 9/1986 | Bartholomew | |
| 4,714,172 | 12/1987 | Morris | 220/86 R |
| 4,770,677 | 9/1988 | Harris | 55/168 |
| 4,790,349 | 12/1988 | Harris | 137/587 |
| 4,816,045 | 3/1989 | Szlaga | 55/168 |
| 4,869,283 | 9/1989 | Oeffling et al. | 137/43 |

Primary Examiner—Gerald A. Michalsky
Attorney, Agent, or Firm—Krass & Young

[57] ABSTRACT

A fuel tank vent valve disposed between the tank and a carbon canister to provide high volume venting between the tank and the canister under normal operating conditions. A diaphragm type control element within the valve pulls an internal valve plate against a seat when the filler pipe cap is removed thereby to close off the vent between the tank and the canister. The system operates with a filler pipe door seal of the type which is opened by the introduction of a filler nozzle. The vent valve is primarily constructed of molded plastic parts.

19 Claims, 1 Drawing Sheet

FUEL TANK VENT SYSTEM AND DIAPHRAGM VALVE FOR SUCH SYSTEM

This is a continuation of copending application Ser. No. 07/470,318 filed on Jan. 25, 1990, now abandoned.

INTRODUCTION

This patent discloses a vehicular fuel tank vent system which vents fuel vapors from the tank to a vapor trap under normal operating conditions, and which assumes a non-venting condition when the fuel tank filler cap is removed. In addition, a diaphragm valve suitable for use in such a system is disclosed.

BACKGROUND OF THE INVENTION

It is well understood in the vehicle fuel storage and delivery art that it is necessary to vent a vehicle fuel tank to relieve vapor pressure build-up which may occur when the filler pipe cap is in place and to permit the escape of air during normal filling operations when the filler cap is removed. Environmental control laws and regulations require that vehicle fuel tank systems include safeguards to prevent the excessive escape of fuel vapors under normal operating conditions and to prevent the escape of raw fuel from the tank in the event of a roll-over accident or the assumption of an abnormal vehicle attitude.

In this connection it is well known to vent the fuel system to a vapor trap such as a carbon canister. It is important to ensure that fuel vapors and/or raw fuel from the tank does not flood the canister during normal vehicle operation o during filling. This can be achieved with a device known as a "head valve"; such a device is disclosed in U.S. Pat. No. 4,753,262 issued June 28, 1988 and assigned to the assignee of this patent. Another rollover valve is shown in Pat. No. 4,095,609 issued June 20, 1978 and assigned to Chrysler Corporation.

SUMMARY OF THE INVENTION

The principal objective of the present invention is to provide a high volume venting system between a fuel tank and a fuel vapor trap, such as a carbon canister, under all normal operating vehicle conditions and to provide a pressure responsive valve in such system to close the vent when the fuel tank filler cap is removed. In general this is accomplished through the use of a vent valve which is connected between the fuel tank and the vapor trap which is held open by vapor pressure in the fuel tank but which closes in response to an atmospheric pressure condition in the portion of the fuel tank filler pipe near the inlet opening of the filler pipe when the cap is removed.

The invention further resides in a fuel tank vent valve suitable for use in a vent system wherein a high volume vent between the fuel tank and a vapor trap is closed whenever the fuel tank fuller cap is removed. This vent valve preferably comprises a valve body formed of plastic or other suitable material and having an inlet connectable to the fuel tank and an outlet connectable to the vapor trap (carbon canister). A valve seat is formed in the body between the inlet and the outlet and mates with an axially movable valve element. Vapor pressure in the tank normally holds the valve element off the seat to permit high volume venting. A control element in the form of a diaphragm is also mounted in the valve body and is mechanically connected to the valve element. One side of the diaphragm is exposed to fuel tank pressure and the other side of the diaphragm is exposed to the pressure conditions in the filler pipe to communicate the atmospheric pressure condition in the filler pipe when the fuel filler cap is removed to the upper side of the diaphragm. The resulting pressure imbalance causes movement of the diaphragm, and the mechanical connection pulls the valve element to the closed position. The closing force may be assisted by a light bias spring. The closure is maintained at all pressures since the effective area of the diaphragm is larger than the valve seat area.

DETAILED DESCRIPTION OF THE ILLUSTRATIVE EMBODIMENT

Figure 1:
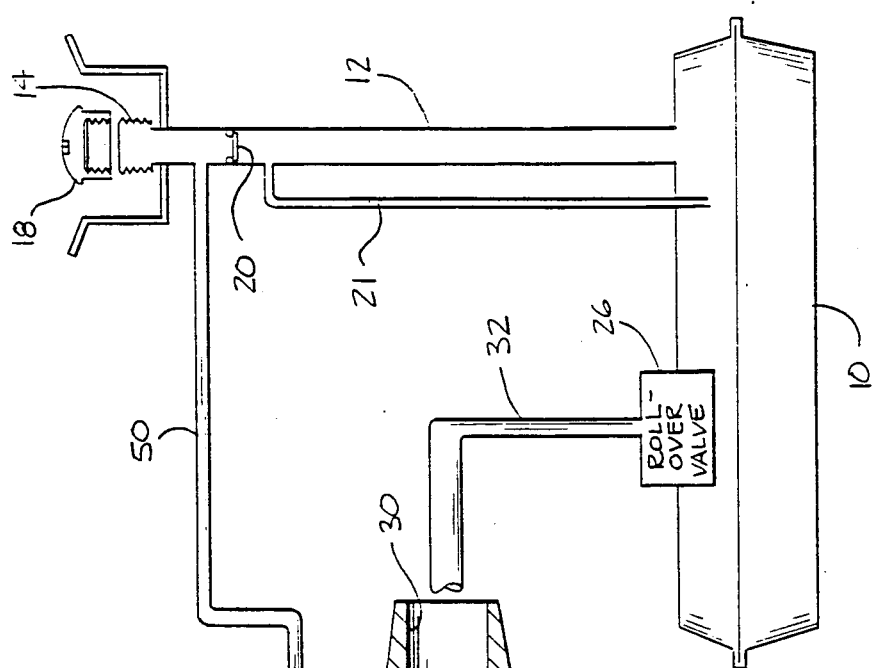
FIG. 1 is an overall schematic view of a fuel vent system embodying the invention and a sectional view of the details of the diaphragm valve showing its location and operative connections in the system.
Figure 2:
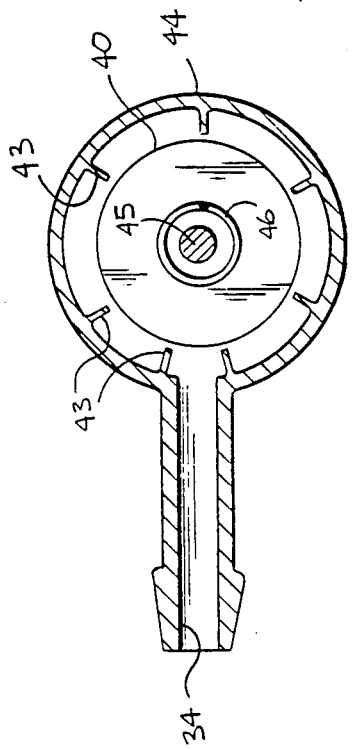
FIG. 2 is a sectional view through a portion of the valve body as indicated.

Referring to the figures, a fuel storage tank 10 is mounted in a vehicle (not shown) and is equipped with a filler pipe 12 which extends to a conventionally threaded inlet opening 14 proximate the exterior body portions 16 of the vehicle. The threaded inlet opening 14 is adapted to receive a cap 18 which, when in place, effectively seals the filler pipe 12.

Filler pipe 12 is additionally provided with a spring biased door 20 which is sufficiently proximate the inlet opening 14 to be displaced open by the introduction of a conventional fuel dispenser valve nozzle (not shown). The door 20 closes when the filler nozzle is removed; i.e., typically after a filling operation has been completed. Door 20, therefore, prevents the excessive escape of fuel vapor from the freshly filled tank 10 during the typically short time period between the termination of the filling operation and the replacement of the cap 18. Door 20 is currently a relatively unsophisticated metal structure; however, the invention disclosed herein contemplates use with doors having significantly more effective seals as well. Such seals may require a designed bleed or a small-volume bypass as hereinafter explained. A conventional vent line 21 runs from the tank to a point in the filler pipe 12 below door 20 to vent displaced air during filling.

The drawing further discloses in detail a vent valve 22 which is connected between the tank 10 and a carbon canister 24 which acts as a fuel vapor trap. The vehicle system may further be provided with a roll-over valve 26 to prevent the escape of raw fuel from the tank 10 through the vent valve 26 in the event of a roll-over accident or an unusual vehicle attitude. Valve 26 may be essentially of known construction.

Vent valve 22 comprises a multi-part body including a first molded plastic body portion 28 having an essentially tubular inlet 30 adapted for connection to a fuel vapor vent line 32 which is connected to the interior of the tank 10 through the roll-over valve 26. Valve body portion 28 further comprises an essentially tubular outlet portion which is adapted for connection to a vent line 36 which is connected to the carbon canister 24. Between the inlet 30 and the outlet 34 the central cylindrical portion of the valve body is provided with a annular valve seat 38 adapted to receive and mate with a disk-like valve element 40 which may also be constructed of molded plastic. Valve element 40 is adapted for longitudinal motion along the illustrated center line and is maintained in its central position by a plurality of ribs 43 which are molded into the cylindrical wall 44 of the central cylindrical portion of the valve body portion 28. An axially projecting finger 45 of the valve element 40 projects into the interior of a light stainless steel bias spring 46 which urges the valve plate 40 against the seat 38. If diaphragm 52 has some spring-like compliance, spring 46 may be omitted.

The vent valve 22 further comprises a second molded plastic body portion 47 forming a tubular inlet 48 which is adapted for connection to a filler pipe pressure line 50 which is connected into the filler pipe 12 above the door 20 and in the vicinity of the fuel inlet 14 for purposes to be described.

A disk-like diaphragm 52 of suitable flexible material such as fluorosilicone rubber is mounted in the valve 22 by way of an annular, peripheral welt 54 which is received in and trapped between the mating flanges 58 and 60 of the valve body portions 48 and 28 respectively. Diaphragm 52 is press fit onto the center pin 62 of a cup-shaped carrier 64 having an annular exterior shoulder 65 to control the shape of the diaphragm 52. Center pin 62 terminates at the lower end in a necked-down portion 66 which receives inwardly projecting spring tangs 68 formed integrally with the valve plate 40 to mechanically interconnect the valve plate 40 with the carrier 64. Assembly of the valve 22 is facilitated by this mechanical interconnection but it will be apparent to those skilled in the art that various alternative constructions are possible in which the elements are either integrally formed, otherwise unified or separated by boundaries at locations other than those shown. The valve body elements 28, 42, and 47 of the illustrated device are adhesively bonded and/or welded by ultrasonic techniques or the like.

Operation

In normal vehicle operation the tank 10 is at least partially filled and the cap 18 is in place on the filler neck 14 to seal the fuel tank. Door 20 is closed but, either because it is a relatively crude seal or includes a designed bleed as previously described, pressures on opposite sides of seal 20 eventually equalize. If the vehicle is in a normal attitude, roll-over valve 26 is open. Therefore, vapor pressure in tank 10 is applied to the under side of the diaphragm 52 by way of line 32 and inlet 30. Similarly, tank vapor pressure is applied to the upper side of the diaphragm and to the cup-shaped member 64 by way of line 50 and inlet 48. The effective areas on opposite sides of the diaphragm 52 and carrier 64 are selected to respond to this equalized pressure condition to apply effectively no force to the valve element 40. Vapor pressure in tank 10, therefore, operates on the top surface of valve plate 40 to displace it against the light action of the spring 46 (canister 24 operates at essentially atmospheric pressure). The vapor pressure in tank 10 is thus communicated through inlet 30 around valve plate 40, clearance for high volume transfer being provided by the ribs 43, through outlet 34 and through line 36 to the canister 24. This is a high volume, low restriction venting condition.

When the cap 18 is removed, atmospheric pressure exists in the area of the filler inlet 14 and is communicated via line 50 to the cup-shaped carrier 64 and, therefore, effectively to the top of the diaphragm 52. Due to the door 20, relatively higher tank pressure is communicated to the bottom of the diaphragm 54 and the net force drives the carrier 64 upwardly within the valve body 22 pulling the valve plate 40 against the seat 38. This closes the vent between the tank 10 and the canister 24 to effectively prevent transmitting any vapor or liquid to the canister during a filling operation.

The system described above is operable with simple metal doors 20 as well as with the more effective seals which are proposed for future automobiles. Moreover, the system is compatible with filler nozzle designs which include provision for vapor extraction during filling.

I claim:

1. In a vehicle fuel system of the type which includes a fuel tank, a filler pipe having an inlet opening for admitting fuel to the tank, a cap for closing the outer end of the filler pipe inlet opening and a vapor trap for collecting fuel vapor vented from the tank, the fuel system further comprising:

a vent valve connected between the tank and the vapor trap and having an open condition and a closed condition; said vent valve including first means for placing said valve in an open, venting condition when the outer end of the filler pipe inlet opening is closed; and second means for placing said valve in a closed, non-venting position when the outer end of the filler pipe inlet opening is open.

2. Apparatus as defined in claim 1 wherein the vent valve comprises:

a valve body having a vapor inlet from the tank, a vapor outlet to the vapor trap, a valve seat between the inlet and outlet and a valve element biased toward and matable with said seat, said valve element being normally responsive to tank pressure to be displaced from said seat to provide vapor venting from the tank to the trap; and a control element connected to the valve element for maintaining the valve element on said seat when the filler pipe inlet is at atmospheric pressure.

3. Apparatus as defined in claim 2 wherein the control element is a diaphragm sealed in said body, means communicating one side of the diaphragm to the filler pipe inlet; and means communicating the other side of the diaphragm to the tank.

4. Apparatus as defined in claim 1 further including a rollover valve connected between the tank and the vent valve.

5. Apparatus as defined in claim 1 wherein said first means includes a vapor vent line from said vent valve to the fuel tank; and said second means includes a vapor pressure line from said filler pipe to said vent valve.

6. A fuel system of the type including a fuel tank, a filler pipe for discharging fuel into the tank, a cap for closing the filler pipe inlet and a vapor trap for collecting fuel vapor vented from the fuel tank, the fuel system further comprising:

a rollover valve disposed between the fuel tank and the vapor trap; and a vent valve having a valve body, a vapor outlet to the vapor trap, and a vapor inlet from the rollover valve, a valve seat between the vapor inlet and the vapor outlet, a valve element matable with the valve seat, and a control element connected to the valve element for maintaining the valve element on the valve seat when the filler pipe inlet is at atmospheric pressure, and for displacing the valve element from the valve seat when the filler pipe inlet is at tank pressure.

7. A fuel system as in claim 6 wherein the control element is a diaphragm.

8. A fuel system as in claim 6 wherein the valve element is biased towards said seat by a spring.

9. A fuel system of the type including a fuel tank, a filler pipe for discharging fuel into the tank, a cap for closing the filler pipe inlet and a vapor trap for collecting fuel vapor vented from the fuel tank, the fuel system further comprising;

a tank vent valve comprising a valve body defining an interior chamber, an inlet connected to the tank and communicating with said chamber, an outlet connected to a vapor trap communicating with said chamber, a valve seat within said chamber and between said inlet and said outlet, a valve element movable within said chamber into and out of engagement with said seat to control communication between said inlet and said outlet, a control element sealingly disposed within and across said chamber to separate said chamber into a first side which is in constant communication with said tank by way of said inlet, and a second side having a second inlet connected in fluent communication with a tank filler pipe effectively proximate the inlet opening thereof;

said control element being mechanically connected to the valve element to urge the valve element positively into engagement with the seat when tank pressure substantially exceeds the pressure adjacent the tank filler pipe opening.

10. Apparatus as defined in claim 9, wherein the control element comprises a flexible diaphragm.

11. Apparatus as defined in claim 10, wherein the effective area of the diaphragm is larger than the effective area of the seat to maintain positive closure at all pressures.

12. A fuel system of the type including a fuel tank, a filler pipe for discharging fuel into the tank, a cap for closing the filler pipe inlet and a vapor trap for collecting fuel vapor vented from the fuel tank, the fuel system further comprising:

a rollover valve;

a vent valve;

means connecting the rollover valve and the vent valve in series between the tank and the vapor trap; and the vent valve having a valve body, a vapor outlet to the vapor trap, and a vapor inlet from the rollover valve, the valve seat between the vapor inlet and the vapor outlet, a valve element matable with the valve seat, and a control element connected to the valve element for maintaining the valve element on the valve seat when the filler pipe inlet is at atmospheric pressure, and for displacing the valve element from the valve seat when the filler pipe inlet is at tank pressure.

13. A fuel system as claimed in claim 12 wherein the valve element is biased toward said seat by a spring.

14. In a vehicle fuel system of the type which includes a fuel tank, a filler pipe having an inlet opening for admitting fuel to the tank, a cap for closing the inlet opening of the filler pipe and a vapor trap for collecting fuel vapor vented from the tank; a venting system comprising:

a partition means dividing the filler neck into an outer chamber communicable with the inlet opening and an inner chamber communicable with the fuel tank;

a vent valve connected between the tank and the vapor trap having an open, venting position and a closed, non-venting position;

means for opening said vent valve when the pressure in the outer chamber is substantially equal to tank pressure; and means for closing said vent valve when the pressure in the outer chamber is at substantially atmospheric pressure.

15. Apparatus as defined in claim 14 wherein the vent valve comprises:

a valve body having a vapor inlet from the tank, a vapor outlet to the vapor trap, a valve seat between the inlet and the outlet and a valve element biased toward and matable with said seat, said valve element being normally responsive to tank pressure to be displaced from said seat to provide vapor venting from the tank to the trap; and a control element connected to the outer chamber and responsive to a pressure differential between the inner chamber and outer chamber to maintain the valve element on the seat.

16. An apparatus as defined in claim 15 wherein the control element is a diaphragm sealed in said body, means communicating one side of the diaphragm to the other chamber; and means communicating the other side of the diaphragm to the inner chamber.

17. In combination with a fuel storage tank for a vehicle having a fuel vapor trap; a fuel system comprising:

a filler pipe having a selectively closeable inlet for discharged fuel into the fuel storage tank;

a rollover valve connected between the tank and the trap to vent the tank when the vehicle is in a normal attitude and to close the tank when the vehicle is not in a normal attitude;

a control valve in series with the rollover valve and operable between opened and closed positions; and condition-responsive means for operating the control valve in response to vapor pressure conditions near the filler pipe inlet.

18. In a vehicle fuel system of the type which includes a fuel tank, a filler pipe for admitting fuel to the tank, a cap for closing the filler pipe inlet and a vapor trap for collecting fuel vapor vented from the tank;

a vent valve connected between the tank and the vapor trap and having an open condition and a closed condition;

said vent valve including first means for opening said vent valve when the filler pipe inlet is closed; and second means for closing said vent valve when the filler pipe inlet is open.

19. Apparatus as defined in claim 18, wherein the vent valve remains closed when the filler pipe inlet is open and fuel is being admitted to the fuel tank.

* * * * *